UNITED STATES PATENT OFFICE.

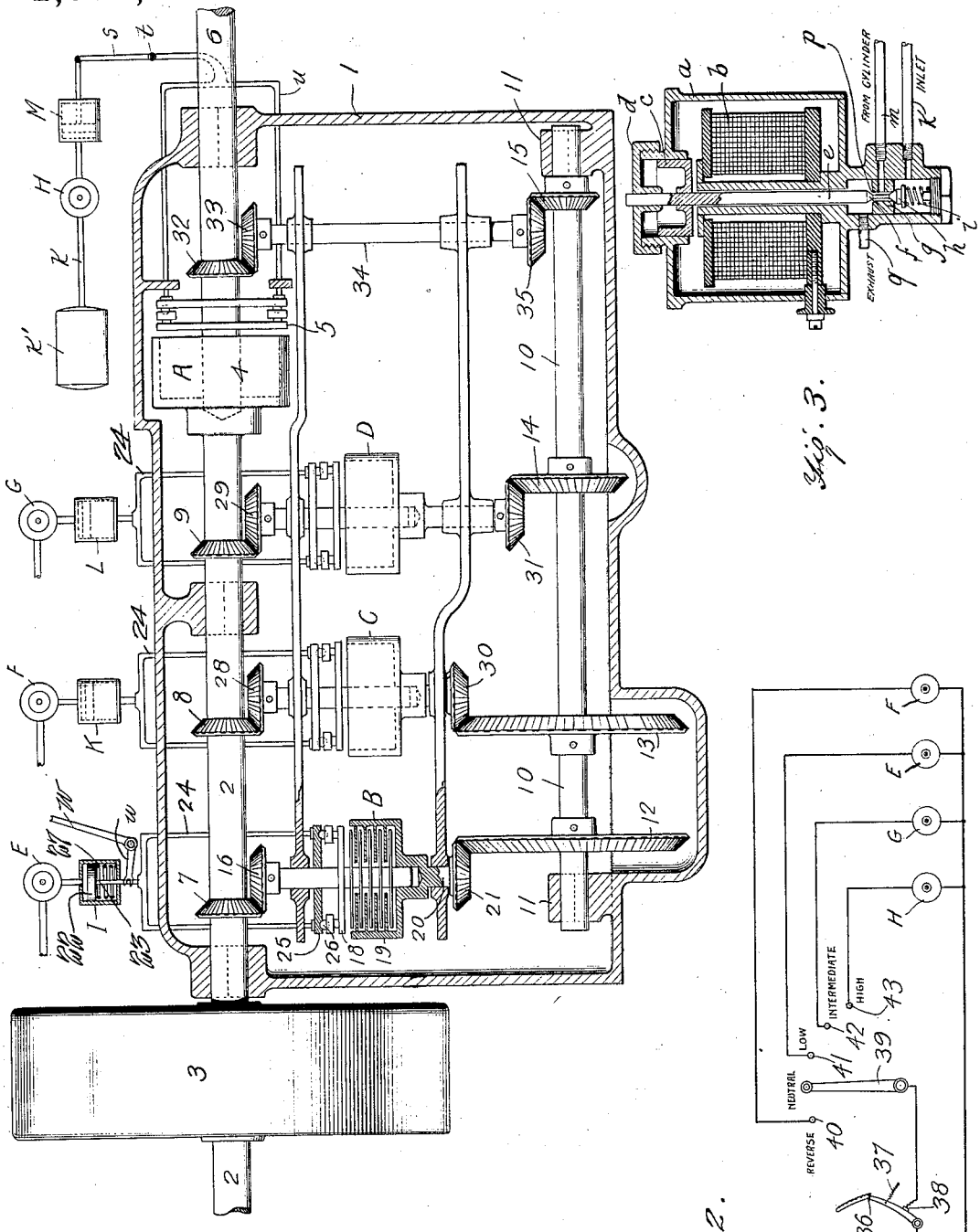

DAVID E. CROUSE AND CHARLES G. EIDSON, OF ANNAPOLIS, MARYLAND, ASSIGNORS TO THE AUTO AIR APPLIANCE COMPANY, OF BALTIMORE, MARYLAND, A CORPORATION OF MARYLAND.

VARIABLE-SPEED MECHANISM.

1,082,624.  Specification of Letters Patent.  Patented Dec. 30, 1913.

Application filed September 20, 1912. Serial No. 721,391.

*To all whom it may concern:*

Be it known that we, DAVID E. CROUSE and CHARLES G. EIDSON, citizens of the United States, and residents of Annapolis, in the county of Anne Arundel and State of Maryland, have made certain new and useful Improvements in Variable-Speed Mechanisms, of which the following is a specification.
Our invention relates to improvements in variable speed mechanism, and it consists in the combinations, constructions and arrangements herein described and claimed.

An object of our invention is to provide a variable speed mechanism for use in automobiles and similar vehicles which will dispense with the noise ordinarily occasioned when gears are brought into mesh.

A further object of our invention is to provide variable speed mechanism in which the changing of the speed is accomplished by the mere shifting of a switch in an electric circuit.

A further object of our invention is to provide an efficient means for producing a change of speed in a driven shaft, this change of speed being effected by the use of certain clutches operated by compressed air, which is in turn controlled by magnets, the latter being under control of the operator.

Other objects and advantages will appear in the following specification, and the novel features of the device will be particularly pointed out in the appended claims.
Our invention is illustrated in the accompanying drawings forming part of this application in which—

Figure 1 is a section through the casing and through one of the clutches contained therein, the other clutches being shown in plan view, Fig. 2 is a diagrammatic view of the circuits for controlling the magnets, and Fig. 3 is a sectional view of one of the magnets.
In carrying out our invention we provide a casing 1 in which is journaled one end of a driving shaft 2, this shaft being provided with a fly-wheel 3 on the outside of the casing. The end of the driving shaft 2 is provided with a clutch member 4 arranged to engage a companion clutch member 5 on the driven shaft 6, one end of which is journaled in the casing 1. The driving shaft is provided with the gears 7, 8 and 9. An auxiliary shaft 10 is journaled in bearings 11, and is provided with four gears 12, 13, 14 and 15.

A series of clutches is provided for connecting the auxiliary shaft 10 with the driving shaft 2. These clutches are shown at B, C and D. The clutch on the driving shaft 2 which connects it directly with the driven shaft 6, we will designate in general by A. These clutches may be of any suitable type. The specific construction of the clutches themselves forms no part of the present invention. In the present instance, we have illustrated these clutches as being of the multiple-disk type. A description of one will suffice for all. The clutch B is provided with a gear 16 on a shaft 17, which bears a clutch member 18. The co-acting clutch member 19 is on a short shaft 20, which bears a gear 21 arranged to mesh with the gear 12.

The means for operating the clutches consists of the magnets E, F, G and H, which control the entrance of air into the cylinders is shown in Fig. 3. It will be under means by which air is admitted into the cylinder is shown in Fig. 3. It will be understood that in describing this magnetic air-controlling device specifically, we do so merely for the purpose of illustration, since any other suitable magnetic controlling means might be used.

Referring now to Fig. 3, we have shown therein a casing *a* containing an electromagnet *b*. The latter is provided with a slidable armature *c* disposed in an extension *d*. The armature is provided with a stem *e*, one portion of which forms a valve *f* arranged to seat in the upper side of a partition *g* and having an end portion *h* arranged to seat on the lower side of the partition. A spring *i* normally keeps the lower valve closed, and the upper valve open. An inlet pipe *k* is arranged to be connected with a source of motive fluid *k'*, such as compressed air or steam. A pipe *m* communicates with the passage *p* in the partition *g*. An exhaust pipe *q* communicates with the space above the partition *g*.

The cylinders I, K, L and M are all provided with pistons, such as that shown at 22. The piston rod 23 connects with a yoke 24 bearing at its end a plate 25. Between the plate 25 and the clutch member 18 are disposed anti-friction balls 26. The piston 22 is normally pressed on by a spring 27.

As will be seen from the drawing the gear 8 meshes with a gear 28 and the gear 9 with the gear 29. The gear 30 of the clutch member C meshes with the gear 13 on the shaft 10, while the gear 31 meshes with the gear 14. A gear 32 on the shaft 6 engages a gear 33 on a shaft 34. The latter is provided with a gear 35, which engages the gear 15 on the shaft 10. All the gears with the exception of the gears 12, 13 and 14 are of the same size and are represented by unity. The gear 14 is larger. For instance, it may be of a diameter of 1.75, while the gears 12 and 13 are still larger and their diameters may be represented by 3.5. It will be apparent that when the clutches A, B or D are thrown in the driven shaft 6 will revolve in the same direction as the driving shaft 2. When, however, the clutch C is thrown in the driven shaft 6 will revolve in an opposite direction. The clutch B when thrown in will give a low speed forward, the clutch C a low reverse speed, the clutch D an intermediate forward speed, and the clutch A a high forward speed. In the drawing we have shown the piston in the cylinder M as connected with a lever $s$ pivoted at $t$ for operating the yoke $u$ of the clutch A.

In Fig. 2 the circuits which operate the magnets are shown diagrammatically. The battery B' is connected on one side with the magnets E, F, G and H, and on the other side with a foot-switch 36, which is normally held by a spring 37 against a contact 38. The latter leads to a rotatable switch arm 39, whose end is arranged to engage the contacts 40, 41, 42 and 43, which correspond to the reverse, low, intermediate and high speeds.

From the foregoing description of the various parts of the device, the operation thereof may be readily understood.

Let us assume that the operator wishes a low forward speed. He moves the arm 39 to the contact 41, shown in Fig. 2. Immediately thereupon the magnet E attracts its armature, which moves the valve H to establish communication between the pipes $k$ and $m$, thereby permitting air to enter through the inlet pipe into the cylinder I. The piston is forced forwardly against the tension of the spring 27, and the yoke 24 presses the plate 25 against the anti-friction balls 26, thereby forcing the clutch member 18 into frictional engagement with the clutch member 19. The shaft 2 therefore communicates its motion through the medium of the gears 7, 16, the clutch B, gears 21, 12, 15, 35, 33 and 32. The shaft 6 will be driven in a forward direction, but at a slower speed. Similarly each of the clutches may be brought into operation by the mere shifting of the switch arm 39, and the desired speed may be attained without the bodily shifting of gears. Hence the grinding noise, which is so objectionable (in vehicles where variable speeds are obtained by means of the movement of gears into and out of mesh with one another) is avoided. This saves great wear on the mechanism, and in fact provides as noiseless a variable speed mechanism as it is possible to obtain. When the operator wishes to disconnect any of the clutches, he may do so by pressing on the foot switch 26, thereby breaking the circuit of the control magnet of any particular clutch. When the armature of the control magnet retracts, the valve $g$ is seated, thereby cutting off the compressed air from the cylinder, while the valve $f$ is unseated, thereby permitting the escape of the air from the cylinder through the exhaust $q$.

In case it should be desirable to operate the clutches manually, we may provide an operating lever W whose arm $w$ is connected with the piston or yoke in such a manner that when the lever is shifted it will force the clutch members together. Such a lever is shown in connection with the piston rod 23 of the piston 22 in Fig. 1. The lever W is to be used in connection with the pneumatic operating mechanism, so that the operator may have control of the clutches in case the pneumatic means should fail.

We claim:—

1. In a variable speed mechanism, a driving shaft, a driven shaft, an auxiliary shaft, connections between the driving shaft and the auxiliary shaft for driving the latter, a plurality of gears on said auxiliary shaft for producing different speeds, a gear on said driven shaft corresponding to each speed, an intermediate gear permanently in mesh with each of the gears on said auxiliary shaft, an intermediate gear permanently in mesh with each of the gears on said driven shaft, a clutch for each speed arranged to transmit the movement of one of said intermediate gears to the other, pneumatic means for operating each of said clutches, and magnetic means for controlling the pneumatic means.

2. In a variable speed mechanism, a driving shaft, a driven shaft, an auxiliary shaft, connections between the driving shaft and the auxiliary shaft for driving the latter, a plurality of gears on said auxiliary shaft for producing different speeds, a gear on said driven shaft corresponding to each speed, an intermediate gear permanently in mesh with each of the gears on said auxiliary shaft, an intermediate gear permanently in mesh with each of the gears on said driven shaft, a clutch for each speed arranged to transmit the movement of one of said intermediate gears to the other, a cylinder associated with each clutch, a piston in said cylinder, a yoke connecting said piston with said clutch, and a solenoid for controlling the passage of motive fluid into the cylinder.

3. In a variable speed mechanism, a driving shaft, a driven shaft, an auxiliary shaft, connections between the driving shaft and the auxiliary shaft for driving the latter, a plurality of gears on said auxiliary shaft for producing different speeds, a gear on said driven shaft corresponding to each speed, an intermediate gear permanently in mesh with each of the gears on said auxiliary shaft, an intermediate gear permanently in mesh with each of the gears on said driven shaft, a clutch for each speed arranged to transmit the movement of one of said intermediate gears to the other, a cylinder associated with each clutch, a piston in said cylinder, a yoke connecting said piston with said clutch, a solenoid for controlling the passage of motive fluid into the cylinder, a switch having contact points corresponding to each of said solenoids, and electric circuit connections between said solenoid and said switch.

4. In a variable speed mechanism, a driving shaft, a driven shaft, an auxiliary shaft, connections between the driving shaft and the auxiliary shaft for driving the latter, means disposed between said auxiliary shaft and said driven shaft for operating the latter at varying speed, said means comprising gears on said auxiliary shaft, gears on said driven shaft, intermediate gears between the gears on the auxiliary shaft and the gears on the driven shaft, clutches for transmitting motion of certain of said intermediate gears to others of said intermediate gears, pneumatic means for operating each of said clutches, and magnetic means for controlling the pneumatic means.

5. In a variable speed mechanism, a driving shaft, a driven shaft, an auxiliary shaft, connections between the driving shaft and the auxiliary shaft for driving the latter, means disposed between said auxiliary shaft and said driven shaft for operating the latter at varying speed, said means comprising gears on said auxiliary shaft, gears on said driven shaft, intermediate gears between the gears on the auxiliary shaft and the gears on the driven shaft, clutches for transmitting motion of certain of said intermediate gears to others of said intermediate gears, a cylinder associated with each clutch, a piston in said cylinder, a yoke connecting said piston with said clutch, and a solenoid for controlling the passage of motive fluid into the cylinder.

DAVID E. CROUSE.
CHAS. G. EIDSON.

Witnesses:
J. M. PREUMAN,
E. LYNN WHITE.